United States Patent
Walker et al.

(10) Patent No.: US 12,497,485 B2
(45) Date of Patent: Dec. 16, 2025

(54) METHOD FOR PRODUCING A POLY(ANTHRANILAMIDE), POLY(ANTHRANILAMIDE) AND USE THEREOF

(71) Applicant: Covestro Deutschland AG, Leverkusen (DE)

(72) Inventors: Karolina Walker, Cologne (DE); Aurel Wolf, Wülfrath (DE); Stefan Westhues, Leverkusen (DE); Mike Schuetze, Leverkusen (DE); Olga Linker, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 500 days.

(21) Appl. No.: 18/001,932

(22) PCT Filed: Jul. 5, 2021

(86) PCT No.: PCT/EP2021/068521
§ 371 (c)(1),
(2) Date: Dec. 15, 2022

(87) PCT Pub. No.: WO2022/008449
PCT Pub. Date: Jan. 13, 2022

(65) Prior Publication Data
US 2023/0257523 A1  Aug. 17, 2023

(30) Foreign Application Priority Data

Jul. 7, 2020 (DE) .................. 102020004070.5
Jun. 29, 2021 (EP) ...................... 21182241

(51) Int. Cl.
*C08G 69/16* (2006.01)
*C08L 77/02* (2006.01)

(52) U.S. Cl.
CPC .............. *C08G 69/16* (2013.01); *C08L 77/02* (2013.01); *C08L 2203/12* (2013.01)

(58) Field of Classification Search
CPC ......... C08L 77/06; C08L 77/10; C08G 69/36; C08G 69/32; C08G 69/16
See application file for complete search history.

(56) References Cited

U.S. PATENT DOCUMENTS

| | | | |
|---|---|---|---|
| 3,409,668 A | 11/1968 | Palazzo et al. | |
| 4,233,459 A | 11/1980 | Kilpper et al. | |
| 4,265,832 A | 5/1981 | Krebs et al. | |
| 4,328,339 A | 5/1982 | Kilpper et al. | |
| 6,184,377 B1 | 2/2001 | Gao | |
| 8,569,217 B2 | 10/2013 | Gieselman et al. | |
| 9,644,167 B2 | 5/2017 | Gieselman et al. | |
| 9,670,350 B2 | 6/2017 | Kou et al. | |
| 9,683,126 B2 | 6/2017 | Kou et al. | |
| 10,179,175 B2 | 1/2019 | Ogle et al. | |
| 10,703,709 B2 | 7/2020 | Jager et al. | |
| 2015/0038640 A1 | 2/2015 | Kou et al. | |

FOREIGN PATENT DOCUMENTS

| | | |
|---|---|---|
| CN | 101973955 A | 2/2011 |
| CN | 101973956 A | 2/2011 |
| CN | 102382001 A | 3/2012 |
| GB | 1430004 A | 3/1976 |

OTHER PUBLICATIONS

Beam et al Synthesis of Monomers and Copolymers from Isatoic Anhydrides, J, Polymer Sci, Chem. edition, vol. 16, pp. 2679-2681), published on Oct. 1978.*
Sima et al Electrosynthesis and properties of some substituted polyanilines in phosphate buffer, Revue Roumaine de Chimie, 2002, 47(1-2), 185-193, published on Jan. 2002.*
Xiaopeng Zhang et al., Synthesis of anthranilamide compounds, Progress in Chemistry, vol. 29, No. 11, Dec. 31, 2017, pp. 1351-1356.
Akihiro Yokoyama et al., Polymerization of 2,5-Diaminoterephthalic acid-Type Monomers for the Synthesis of Polyamides Containing Ladder Unit, Polymer Chemistry, vol. 55, May 3, 2017, pp. 2365-2372.
Amin, F. et al, "Polyanthranilides. I. Synthesis and Characterization of Polyamides from isatoic Anhydrides", J. Macromol. Sci .- Chem. 1982, A17(3), pp. 481-488.
Staiger, R. P. et al, "Isatoic Anhydride. II. Reactions of Isatoic Anhydride with Ammonia", Journal of Organic Chemistry 1948, 13, pp. 347-352.

(Continued)

*Primary Examiner* — Gregory Listvoyb
(74) *Attorney, Agent, or Firm* — Donald R. Palladino

(57) ABSTRACT

The invention relates to a method for producing a poly (anthranilamide) via the polymerisation of isatoic anhydride, preferably in the presence of a solvent, on a starter at a reaction temperature in the region of 110° C. to 300° C., wherein the starter comprises an aliphatic mono- or diamine with 5 to 13 carbon atoms, an araliphatic mono- or diamine with 7 to 15 carbon atoms, an aromatic diamine with 6 to 13 carbon atoms, a carboxylic acid amide of formula Ar—(C=O)NHR, where Ar represents an aromatic group substituted with an amine NH— or NH2 group and R represents an aromatic or aliphatic group, or a mixture of the above-mentioned starters, and wherein the solvent, if used, comprises an organic solvent, which is in liquid form at the reaction temperature, an ionic liquid or a mixture of these solvents, obtaining a poly(anthranilamide) based on the starter. The invention also relates to the poly(anthranilamide) obtained with the method according to the invention and to the use thereof in the production of fibres or composite materials.

6 Claims, No Drawings

(56) References Cited

OTHER PUBLICATIONS

Sasaki, Yoshiyuki et al., , Journal of Organic Chemistry 1987, 52, pp. 315-316.
Clark, Robert H. et al, "Isatoic Anhydride. I. Reactions with Primary and Secondary Amines and with Some Amides", The Journal of Organic Chemistry, vol. 09, No. 1, Jan. 1, 1944, pp. 55-67.
International Search Report, PCT/EP2021/068521, date of mailing: Oct. 26, 2021, Authorized officer: Christian Wohnhaas.

* cited by examiner

METHOD FOR PRODUCING A POLY(ANTHRANILAMIDE), POLY(ANTHRANILAMIDE) AND USE THEREOF

CROSS-REFERENCE TO RELATED APPLICATION

This application is a national stage application under 35 U.S.C. § 371 of PCT/EP2021/068521, filed Jul. 5, 2021, which claims the benefit of European Application No. 21182241.6, filed Jun. 29, 2021 and German Application No. 10 2020 004 070.5, filed Jul. 7, 2020, each which is incorporated herein by reference.

FIELD

The present invention relates to a process for preparing a poly(anthranilamide) by polymerizing isatoic anhydride, preferably in the presence of a solvent, onto a starter at a reaction temperature in the range from 110° C. to 300° C., wherein the starter comprises an aliphatic mono- or diamine having 5 to 13 carbon atoms, an araliphatic mono- or diamine having 7 to 15 carbon atoms, an aromatic diamine having 6 to 13 carbon atoms, a carboxamide of the formula Ar—(C=O)NHR in which Ar denotes an aromatic radical substituted by an aminic NH or $NH_2$ group and R denotes an aromatic or aliphatic radical, or a mixture of the aforementioned starters, and wherein the solvent, if used, comprises an organic solvent which is in liquid form at the reaction temperature, an ionic liquid or a mixture of the aforementioned solvents, to obtain a poly(anthranilamide) based on the starter. The invention further relates to the poly(anthranilamides) obtainable by the process of the invention, and to the use thereof in the production of fibers or of composite materials.

BACKGROUND

Aromatic polyamides (also called aramids) in which amide groups are bonded to aromatic groups are known from the prior art and are distributed under trade names such as Kevlar, Twaron (poly(para-phenyleneterephthalamide)) or Nomex, Teijinconex (poly(meta-phenyleneisophthalamide)). They find use in various fields. A prominent example is the production of fibers, especially textile fibers. Fibers produced from aramids are notable for very high strength, high impact resistance, high elongation at break and good vibration damping. They are additionally very heat- and fire-resistant. A disadvantage is high cost compared to many other polymers. Aramids are usually prepared by polycondensation from an aromatic dicarbonyl halide ClCO—$Ar^1$—COCl and an aromatic diamine $H_2N$—$Ar^2$—$NH_2$, which necessarily leads to a polymer structure having alternating units derived from the dicarboxylic acid and the diamine (–[—CO—$Ar^1$—CO—NH—$Ar^2$—NH]—; AABB polymer structure).

A. F. Amin, B. P. Suthar and S. R. Patel describe, in *J. Macromol. Sci.-Chem.* 1982, A17(3), 481-488, the preparation of poly(anthranilamides) having 3 to 10 repeat units. The synthesis is effected by ring-opening polymerization (also ROP hereinafter) of isatoic anhydride, wherein the starter used is $HCl_{(aq)}$, anthranilamide ($H_2N$-ortho-$C_6H_4$—(C=O)$NH_2$), N-methylaniline and ortho-chloroaniline. Experiments with water, ethanol, ortho-cresol, dilute ammonia and formamide as starter did not lead to formation of the desired polymeric product. The synthesized polymers can therefore be represented in terms of formula as follows:

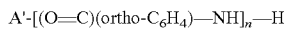

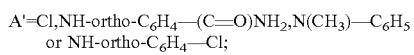

n=3 to 10.

Given the comparatively low number of repeat units, the products formed should if anything be referred to as oligomers. There is no description of the use of diamines of any kind, aliphatic monoamines, araliphatic monoamines or N-alkyl- or N-arylcarboxamides that derive from aromatic carboxylic acids having an aminic NH or $NH_2$ group on the aromatic ring as starter.

The reaction of isatoic anhydride with ammonia in various concentrations was described as early as 1947 by R. P. Staiger and E. C. Wagner (published in 1948 in *Journal of Organic Chemistry* 1948, 13, 347-352). At low ammonia concentrations, anthranilamide was obtained with elimination of carbon dioxide. At higher ammonia concentrations, cyclic benzoylurea was obtained instead, with elimination of water. With reference to even earlier studies, the formation of "abnormal" products from ammonia and isatoic anhydride is likewise reported, specifically when isatoic anhydride is treated with just a half equivalent of ammonia. This affords an amorphous product which is described as a condensation product. The literature reference *J. Macromol. Sci.-Chem.* 1982, A17(3), 481-488 that has already been cited also refers to "abnormal products" with reference to earlier studies (abnormal in the sense that these products are insoluble in ethanol and melt over a wide temperature range). These abnormal products, according to *J. Macromol. Sci.-Chem.* 1982, A17(3), 481-488, however, have never been characterized systematically, and the multitude of reports suggests, according to this reference, that such "abnormal" products are simply mixtures of "normal" products. Robert H. Clark and E. C. Wagner, in *Journal of Organic Chemistry*, 1944, 9, 55-67, likewise report "abnormal" products, which the authors consider to be oligomeric amides of the following type:

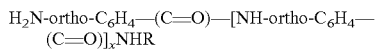

in which x does not exceed a value of 1 or 2. The possibility of forming macromolecular products is merely suspected, and is also attributed to a possible association or aggregation.

U.S. Pat. No. 9,683,126 B2 describes polymers having a C—C backbone onto which up to 10 anthranilamide units are grafted via a divalent bridge. The base polymer that forms the C—C backbone especially comprises differently substituted poly(methacrylates) or polymeric vinylaromatic hydrocarbons.

There is no description in these literature references of the formation of higher molecular weight poly(anthranilamides) in which high molar masses are achieved via a multitude of repeat anthranilamide units and not by grafting onto another polymer (i.e. the formation of "true" anthranilamide polymers by contrast with oligomers having only few repeat units or copolymers). Conventionally used aramids other than the (poly(para-phenyleneterephthalamides)) and (poly (meta-phenyleneisophthalamides)) that were mentioned at the outset can be prepared in high molar masses (albeit under very corrosive conditions owing to the use of acid chlorides, which is costly and inconvenient in terms of apparatus and process operation) and also have good performance properties, but are very costly. Moreover, the commonly used processes for preparing such aramids are based on a polycondensation reaction with formation of an AABB polymer structure, which requires very precise compliance with the reaction stoichiometry for formation of polymers having high molar masses.

Yoshiyuki Sasaki and Pierre H. Dixneuf describe, in *Journal of Organic Chemistry* 1987, 52, 315-316, the thermal decarboxylation of isatoic anhydride to form a thermally stable polyamide. The reaction occurs on heating to temperatures that are still below the melting point. The following structure is suggested for the solid product:

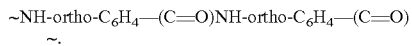

By gel permeation chromatography, a mass-average molar mass $M_W$ corresponding to about five times the mass of isatoic anhydride was ascertained. The products are thus oligomers, and this also accords with the fact that the products found were meltable. (It is known that high molecular weight poly(anthranilamides) cannot be melted without decomposition.)

Attempts were also made to catalyze the reaction by means of dopants. The dopant was used in a proportion of 0.01% of the mass of isatoic anhydride. In the case of doping with anthranilamide, 14% of the theoretically expected amount of $CO_2$ was eliminated, and 81% in the case of doping with sodium acetate. This compares with the elimination of only 2% of the theoretically expected amount of $CO_2$ without dopant. With 1% sodium acetate, a mass-average molar mass of 1280 g/mol was found, but with high polydispersity.

There was therefore a need for further improvements in the field of aramid chemistry.

SUMMARY

Taking account of this need, the present invention therefore provides a process for preparing a poly(anthranilamide), comprising the steps of:
(A) providing isatoic anhydride;
(B) polymerizing the isatoic anhydride, preferably in the presence of a solvent, onto a starter at a reaction temperature in the range from 110° C. to 300° C., especially in the range from 150° C. to 300° C.,
  wherein the starter comprises an aliphatic mono- or diamine having 5 to 13 carbon atoms, an araliphatic mono- or diamine having 7 to 15 carbon atoms, an aromatic diamine having 6 to 13 carbon atoms, a carboxamide of the formula Ar—(C=O)NHR in which Ar denotes an aromatic radical substituted by an aminic NH or $NH_2$ group (especially $H_2N$—$C_6H_4$) and R denotes an aromatic or aliphatic radical, or a mixture of the aforementioned starters,
  wherein the solvent, if used, comprises an organic solvent which is in liquid form at the reaction temperature, an ionic liquid or a mixture of the aforementioned solvents,
to obtain a poly(anthranilamide) based on the starter.

The present invention further provides a poly(anthranilamide) of the formula

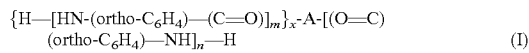

in which
m and n denote the number of repeat units,
x is 0 (in the case of monofunctional starters) or 1 (in the case of difunctional starters), A derives from a starter molecule comprising aminic NH or $NH_2$ groups by removal of a hydrogen atom from all aminic NH and $NH_2$ groups, wherein the starter molecule is an aliphatic mono- or diamine having 5 to 13 carbon atoms, an araliphatic mono- or diamine having 7 to 15 carbon atoms, an aromatic diamine having 6 to 13 carbon atoms or a carboxamide of the formula Ar—(C=O)NHR in which Ar denotes an aromatic radical substituted by an aminic NH or $NH_2$ group (especially $H_2N$—$C_6H_4$) and R denotes an aromatic or aliphatic radical.

Finally, the invention provides for the use of a poly(anthranilamide) of the invention in the production of fibers or of composite materials from poly(anthranilamide) and (at least) one other material comprising a metal, a mineral material or a polymer other than poly(anthranilamide).

In the terminology of the present invention, the expression aminic NH or $NH_2$ groups relates to primary or secondary organic amines (as opposed to other compounds having NH or $NH_2$ groups, such as, in particular, amides), i.e. to organic compounds in which an NH or $NH_2$ group is bonded to a carbon atom that does not bear any further heteroatoms.

Araliphatic mono- and diamines are understood to mean those mono- and diamines that have aromatic and aliphatic groups. Preferably all amino groups in such a mono- or diamine are bonded to those carbon atoms directly adjacent to an aromatic group, as, for example, in the case of xylylenediamine.

Organic solvents are understood to mean nonionic organic solvents, as opposed to ionic liquids (=low-melting (i.e. below 100° C.) salts).

The method crucial for the determination of the number of repeat units m+n in the context of the present invention is $^1$H NMR spectroscopy. This gives an average for the number of repeat units, from which the number-average molar mass of the poly(anthranilamide) can be calculated. Details are described in the "Analysis" section further down.

There now follows a brief summary of various possible embodiments of the invention.

In a first embodiment of the process of the invention, which can be combined with all other embodiments, the reaction temperature is in the range from 120° C. to 300° C., preferably in the range from 150° C. to 300° C., more preferably in the range from 160° C. to 280° C. and most preferably in the range from 170° C. to 260° C.

In a second embodiment of the process of the invention, which can be combined with all other embodiments, step (B) is conducted at a pressure in the range from 1.0 $bar_{(abs.)}$ to 5.0 $bar_{(abs.)}$.

In a third embodiment of the process of the invention, which can be combined with all other embodiments, the aliphatic primary or secondary mono- or diamine having 5 to 13 carbon atoms comprises neopentylamine, hexamethylenediamine, methylenedicyclohexyldiamine and/or pentamethylenediamine.

In a fourth embodiment of the process of the invention, which can be combined with all other embodiments, the araliphatic mono- or diamine having 7 to 15 carbon atoms comprises xylylenediamine.

In a fifth embodiment of the process of the invention, which can be combined with all other embodiments, the aromatic diamine having 6 to 13 carbon atoms comprises methylenediphenylenediamine, naphthylenediamine and/or tolylenediamine.

In a sixth embodiment of the process of the invention, which can be combined with all other embodiments, the carboxamide of the formula Ar—(C═O)NHR comprises N-neopentylanthranilamide (Ar=ortho-$C_6H_4$—$NH_2$; R=neopentyl).

In a seventh embodiment of the process of the invention, which can be combined with all other embodiments except those that envisage the use of a solvent in step (B), the polymerizing is conducted in the absence of a solvent, wherein step (B) is followed by:
(C)(i) dissolving the poly(anthranilamide) in a mineral acid to obtain a mineral acid solution of the poly (anthranilamide);
(D)(i) isolating the poly(anthranilamide) dissolved in the mineral acid from the mineral acid solution, comprising a step of precipitating in water.

In an eighth embodiment of the process of the invention, which is a particular configuration of the seventh embodiment, the mineral acid comprises sulfuric acid, hydrochloric acid, nitric acid and/or phosphoric acid and is especially sulfuric acid.

In a ninth embodiment of the process of the invention, which can be combined with all other embodiments except those that rule out the use of a solvent in step (B) or envisage a pure solvent polymerization for this step, the polymerizing is conducted in the presence of a solvent, wherein the solvent comprises an organic solvent which is in liquid form at the reaction temperature, or comprises a mixture of such an organic solvent and an ionic liquid, and, in step (B), the poly(anthranilamide) based on the starter is obtained in such a way that it is suspended in the solvent, wherein step (B) is followed by:
(C)(ii) dissolving the poly(anthranilamide) suspended in the solvent in a mineral acid and separating off the solvent to obtain a mineral acid solution of the poly (anthranilamide);
(D)(ii) isolating the poly(anthranilamide) dissolved in the mineral acid from the mineral acid solution, comprising a step of precipitating in water.

In a tenth embodiment of the process of the invention, which is a particular configuration of the ninth embodiment, the mineral acid comprises sulfuric acid, hydrochloric acid, nitric acid and/or phosphoric acid and is especially sulfuric acid.

In an eleventh embodiment of the process of the invention, which is a particular configuration of the ninth and tenth embodiments, the solvent is removed in step (C)(i) by filtration, centrifugation or phase separation.

In a twelfth embodiment of the process of the invention, which can be combined with all other embodiments except those that rule out the use of a solvent in step (B) or envisage a suspension polymerization for this step, the polymerizing of the isatoic anhydride is conducted in the presence of a solvent, wherein the solvent comprises an ionic liquid or a mixture of an ionic liquid and an organic solvent which is in liquid form at the reaction temperature, and, in step (B), the poly(anthranilamide) based on the starter is obtained in such a way that it is dissolved in the solvent, wherein step (B) is followed by:
(D)(iii) isolating the poly(anthranilamide) dissolved in the solvent from the solution in the solvent, comprising a step of precipitating in water.

In a thirteenth embodiment of the process of the invention, which is a particular configuration of the ninth to twelfth embodiments, the organic solvent comprises diphenyl ether, N-methyl-2-pyrrolidone (NMP), 1,3-dimethyl-2-imidazolidinone (DMI) and/or hexamethylphosphoramide.

In a fourteenth embodiment of the process of the invention, which is a particular configuration of the ninth to thirteenth embodiments, the ionic liquid comprises 1-ethyl-3-methylimidazolium acetate, 1-butyl-3-methylimidazolium acetate, 1-butyl-3-methylimidazolium butyrate, 1-butyl-3-methylimidazolium nitrate, 1-butyl-3-methylimidazolium methylsulfonate and/or dialkylimidazolium phosphates (such as, in particular, butyl-3-methylimidazolium phosphate, dimethylimidazolium diethylphosphate ("MMIM-DEP") and ethylmethylimidazolium diethylphosphate ("EMIM-DEP")).

In a fifteenth embodiment of the process of the invention, which is a particular configuration of the ninth to fourteenth embodiments, the precipitating in water is effected by adding the solution of the poly(anthranilamide) to a 5-fold to 20-fold volumetric excess of water.

In a sixteenth embodiment of the process of the invention, which can be combined with all other embodiments, a molar ratio of isatoic anhydride to starter chosen in step (B) is in the range from 20 to 2500, preferably in the range from 40 to 2500, more preferably in the range from 50 to 2400 and most preferably in the range from 70 to 2000, so as to obtain, in particular, a (poly)anthranilamide of the formula (I) having values of m+n in the range from 20 to 2500, preferably in the range from 40 to 2500, more preferably in the range from 50 to 2400 and most preferably in the range from 70 to 2000.

In a seventeenth embodiment of the process of the invention, which can be combined with all other embodiments, the providing of isatoic anhydride in step (A) comprises a chemical conversion of anthranilic acid.

In an eighteenth embodiment of the process of the invention, which is a particular configuration of the seventeenth embodiment, the chemical conversion of anthranilic acid is selected from a reaction of anthranilic acid with
carbon monoxide in the presence of a catalyst (especially in the presence of a Pd or Pt catalyst) or
a phosgenation medium selected from phosgene, diphosgene, triphosgene, oxalyl chloride, 1,1-carbonyldiimidazole and/or dimethyl carbonate.

In a nineteenth embodiment of the process of the invention, which is a particular configuration of the seventeenth and eighteenth embodiments, the anthranilic acid is obtained by fermenting a raw material comprising
a fermentable carbon-containing compound, preferably starch hydrolyzate, sugarcane juice, sugarbeet juice, hydrolyzates of lignocellulose-containing raw materials or mixtures thereof,
and
a nitrogen-containing compound, preferably gaseous ammonia, aqueous ammonia, ammonium salts, urea or mixtures thereof.

In a twentieth embodiment of the process of the invention, which is a particular configuration of the nineteenth embodiment, the fermentable carbon-containing compound comprises starch hydrolyzate, sugarcane juice, sugarbeet juice and/or hydrolyzates of lignocellulose-containing raw materials comprises, and in which the nitrogen-containing compound gaseous ammonia, aqueous ammonia, ammonium salts and/or urea.

In a first embodiment of the poly(anthranilamide) of the invention, which can be combined with all other embodiments, the aliphatic primary or secondary mono- or diamine having 5 to 13 carbon atoms is neopentylamine, hexamethylenediamine, methylenedicyclohexyldiamine or pentamethylenediamine.

In a second embodiment of the poly(anthranilamide) of the invention, which can be combined with all other embodiments, the araliphatic mono- or diamine having 7 to 15 carbon atoms is xylylenediamine.

In a third embodiment of the poly(anthranilamide) of the invention, which can be combined with all other embodiments, the aromatic diamine having 6 to 13 carbon atoms is methylenediphenylenediamine, naphthylenediamine or tolylenediamine.

In a fourth embodiment of the poly(anthranilamide) of the invention, which can be combined with all other embodiments, the carboxamide of the formula Ar—(C=O)NHR is N-neopentylanthranilamide (Ar=ortho-$C_6H_4$—$NH_2$; R=neopentyl).

In a fifth embodiment of the poly(anthranilamide) of the invention, which can be combined with all other embodiments, m+n is in the range from 20 to 2500, preferably in the range from 40 to 2500, more preferably in the range from 50 to 2400 and most preferably in the range from 70 to 2000.

In a first embodiment of the use of the invention, the fibers or composite materials serve for production of protective equipment (especially, but not limited to, items of apparel, for example of protective suits and vests) for defense from fire, splinter formation, the penetration of splinters, mechanical impacts (including shots) or cuts.

In a second embodiment of the use of the invention, which can be combined with all other embodiments, the fibers or composite materials serve for production of sports equipment.

DETAILED DESCRIPTION

The embodiments briefly outlined above and further possible embodiments of the invention are elucidated in detail hereinafter. All embodiments may be combined with one another as desired unless stated otherwise or unambiguously apparent from the context.

In step (A) of the process of the invention, isatoic anhydride is provided for the purpose of subsequent polymerization. Isatoic anhydride may in principle be prepared by any of the processes known in the specialist field for synthesis of that compound. Typically, the synthesis proceeds from anthranilic acid (=ortho-aminobenzoic acid) and is effected, for example, by reaction thereof with phosgene, especially in a hydrochloric acid medium. Rather than phosgene, it is also possible to use diphosgene, triphosgene or further phosgenation media known from the prior art, such as oxalyl chloride, 1,1-carbonyldiimidazole and dimethyl carbonate. Likewise possible is the reaction of anthranilic acid with carbon monoxide in the presence of a catalyst, especially in the presence of a Pd or Pt catalyst, in order to obtain isatoic anhydride.

Anthranilic acid in turn can be prepared by known chemical processes. One example of a suitable chemical method is the reaction of phthalimide with sodium hypochlorite. Phthalimide can itself be obtained from phthalic anhydride and ammonia. The whole process is well known. An industrial process is likewise described in the patent literature; see, for example, DE 29 02 978 A1 and EP 0 004 635 A2. In addition, a fermentative preparation route for anthranilic acid has recently been published, which proceeds from renewable raw materials and is therefore suitable for safeguarding fossil raw materials and reducing the size of the $CO_2$ footprint; see, for example, WO 2018/002088 A1, page 13 line 26 to page 22 line 15, and the literature cited therein. This fermentative process may also be employed in the process of the invention. In this embodiment, step (A) of the process of the invention therefore comprises the fermenting of a raw material comprising a fermentable carbon-containing compound, preferably starch hydrolyzate, sugarcane juice, sugarbeet juice, hydrolyzates of lignocellulose-containing raw materials or mixtures thereof, and a nitrogen-containing compound, preferably gaseous ammonia, aqueous ammonia, ammonium salts, urea or mixtures thereof.

Preferably, the fermentable carbon-containing compound comprises starch hydrolyzate, sugarcane juice, sugarbeet juice and/or hydrolyzates of lignocellulose-containing raw materials comprises, and in which the nitrogen-containing compound gaseous ammonia, aqueous ammonia, ammonium salts and/or urea. Microorganisms suitable for performance of the fermentation are especially *Escherichia coli, Pseudomonas putida, Corynebacterium glutamicum, Ashbya gossypii, Pichia pastoris, Hansenula polymorpha, Yarrowia lipolytica, Zygosaccharomyces bailii* or *Saccharomyces cerevisiae*.

In step (B) of the process of the invention, the isatoic anhydride provided in step (A) is polymerized with ring opening (ROP) and elimination of $CO_2$. The starter to be used in accordance with the invention comprises an aliphatic mono- or diamine having 5 to 13 carbon atoms, an araliphatic mono- or diamine having 7 to 15 carbon atoms, an aromatic diamine having 6 to 13 carbon atoms, a carboxamide of the formula Ar—(C=O)NHR in which Ar denotes an aromatic radical substituted by an aminic NH or $NH_2$ group (especially $H_2N$—$C_6H_4$) and R denotes an aromatic or aliphatic radical, or a mixture of the aforementioned starters.

In one embodiment of the invention, an aliphatic primary or secondary mono- or diamine having 5 to 13 carbon atoms is used, specifically preferably neopentylamine, hexamethylenediamine (especially hexamethylene-1,6-diamine), methylenedicyclohexyldiamine (especially 2,2'-, 2,4'- and/or 4,4'-methylenedicyclohexyldiamine) and/or pentamethylenediamine (especially pentamethylene-1,5-diamine).

In a further embodiment of the invention, an araliphatic mono- or diamine having 7 to 15 carbon atoms is used, specifically preferably xylylenediamine (especially xylylene-1,3-diamine).

In a further embodiment of the invention, an aromatic diamine having 6 to 13 carbon atoms is used, specifically preferably methylenediphenylenediamine (especially 2,2'-, 2,4'- and/or 4,4'-methylenediphenylenediamine), naphthylenediamine (especially naphthylene-1,5-diamine) and/or tolylenediamine (especially meta- and/or ortho-tolylenediamine).

In a further embodiment of the invention, a carboxamide of the formula Ar—(C=O)NHR is used, specifically N-neopentylanthranilamide (Ar=ortho-$C_6H_4$—$NH_2$; R=neopentyl).

The polymerization is effected at a reaction temperature in the range from 110° C. to 300° C., preferably 120° C. to 300° C., more preferably 150° C. to 300° C., even more preferably 160° C. to 280° C. and very exceptionally preferably 170° C. to 260° C. The polymerization can be conducted (i) without solvent ("neat", "bulk polymerization") or, preferably, in the presence of a solvent. In the latter case, a suitable solvent is (ii) an organic solvent which is liquid at the reaction temperature, (iii) an ionic liquid or (iv) a mixture of the two. Suitable solvents for case (ii) are especially diphenyl ether, N-methyl-2-pyrrolidone (NMP; preferably in conjunction with $CaCl_2$ as solubilizer), 1,3-dimethyl-2-imidazolidinone (DMI) and/or hexamethylphosphoramide. These are in liquid form at the suitable reaction temperatures (see above). For case (iii), in principle, the use of ionic liquids known in the specialist field is conceivable, especially 1-ethyl-3-methylimidazolium acetate, 1-butyl-3-methylimidazolium acetate, 1-butyl-3-methylimidazolium butyrate, 1-butyl-3-methylimidazolium nitrate, 1-butyl-3-methylimidazolium methylsulfonate and/or dialkylimidazolium phosphates (such as, in particular, butyl-3-methylimidazolium phosphate, dimethylimidazolium diethylphosphate ("MMIM-DEP") and ethylmethylimidazolium diethylphosphate ("EMIM-DEP")).

In the case of performance of the ROP without solvent (i), the isatoic anhydride is converted in the molten state, i.e. over and above a temperature of 230° C. The aforementioned upper limits for the reaction temperature are also preferred for the polymerization without solvent. The starter should therefore have a sufficiently high boiling point under the chosen reaction conditions. In principle, the reaction does not make any particular demands on reaction pressure. The ROP can therefore be conducted at ambient pressure. However, it is also possible to react the starter with the isatoic anhydride under elevated pressure relative to ambient pressure, especially at a pressure in the range from 1.1 $bar_{(abs.)}$ to 5.0 $bar_{(abs.)}$, in order to minimize losses of starter through evaporation. It is likewise conceivable to start the reaction at ambient pressure or slightly elevated pressure (for example 1.1 $bar_{(abs.)}$) and to permit an increase in pressure, especially up to a defined maximum pressure of preferably 5.0 $bar_{(abs.)}$, owing to the elimination of carbon dioxide. The apparatus used for the polymerization is preferably provided with a pressure-retaining valve that assures compliance with the target maximum pressure. The above details with regard to pressure are of course also applicable to the performance of the reaction in the presence of a solvent.

In the case of performance without solvent, polymerization commences in homogeneous phase (in the melt). However, as polymerization progresses, there is rapid precipitation of polymer formed, such that a suspension of polymer in as yet unconverted starter and as yet unconverted monomer is obtained. As polymerization progresses further, there is generally substantial solidification of the entire reaction mixture.

The workup in this case preferably comprises the following steps:
(C)(i) dissolving the poly(anthranilamide) in a mineral acid;
(D)(i) isolating the poly(anthranilamide) dissolved in the mineral acid from the mineral acid solution, comprising a step of precipitating in water.

A suitable mineral acid for the performance of step (C)(i) is especially sulfuric acid, hydrochloric acid, nitric acid and/or phosphoric acid. Sulfuric acid is preferred, especially sulfuric acid having a concentration by mass in the range from 96% to 100%, preferably 96% to 98%. The dissolving is preferably effected at a temperature in the range from 20° C. to 100° C.

In step (D)(i) of this embodiment of the process of the invention, the poly(anthranilamide) is isolated from the mineral acid solution obtained in step (C). This is accomplished by precipitating with water. For this purpose, it is preferable to add the mineral acid solution of the poly(anthranilamide) to a 5-fold to 20-fold volumetric excess of water. The poly(anthranilamide) precipitates out here, and can be removed easily, for instance by filtration or centrifugation. Further workup steps for purification may follow.

However, the ROP is preferably conducted in the presence of a solvent. The polymeric product, depending on the solvent used, is obtained here as a suspension or solution in the solvent chosen.

If an organic solvent (ii) is used, a suspension of the poly(anthranilamide) is generally obtained in step (B) (suspension polymerization). In this case, the workup of the process product in step (B) preferably comprises the steps of:
(C)(ii) dissolving the poly(anthranilamide) suspended in the solvent in a mineral acid and separating off the solvent to obtain a mineral acid solution of the poly(anthranilamide);
(D)(ii) isolating the poly(anthranilamide) dissolved in the mineral acid from the mineral acid solution, comprising a step of precipitating in water.

The preferred conditions mentioned above for case (i) of the steps of dissolving and isolating are also applicable to case (ii). The removal of the organic solvent additionally required here is preferably effected by filtration, centrifugation or phase separation. The removal may either precede the dissolving of the poly(anthranilamide) in mineral acid (in which case solid polyanthranilamide that generally still also contains trapped organic solvent is filtered off and then dissolved in the mineral acid) or follow thereafter (in which case organic solvent that has precipitated or is insoluble in the mineral acid is separated off).

If the solvent used in step (B) is an ionic liquid (iii), this step generally affords a solution of the poly(anthranilamide) (solution polymerization). Since the polymeric product in this case is already in solution, there is no need for a dissolving step (step (C) in cases (i) and (ii)). In this case, the workup of the process product in step (B) therefore preferably comprises the step of:
(D)(iii) isolating the poly(anthranilamide) dissolved in the solvent from the solution in the solvent, comprising a step of precipitating in water.

The preferred conditions mentioned above for case (i) for the step of isolating are also applicable to case (iii).

If a mixture of an organic solvent and an ionic liquid is used (iv) in step (B), whether the process product is a solution or suspension depends on the mixing ratio. Depending on what is present, the further workup is as described above for case (iii) (solution) or for case (ii) (suspension).

Recovered solvent is preferably recycled in any case. For this purpose, a purification may be required, which can be effected by the methods known in the specialist field. On account of their high cost, the recycling of ionic liquids in particular is important. For this purpose, the ionic liquids obtained in the isolation of the poly(anthranilamide) in step (D)(iii) or step (D)(iv) are dried at elevated temperature and reduced pressure, especially at a temperature in the range from 50° C. to 100° C. and a pressure in the range from 1 $mbar_{(abs.)}$ to 100 $mbar_{(abs.)}$.

When the process product from step (B) is in the form of a solution, it is also conceivable to process this solution directly further to give the desired end product, especially to spin fibers of the poly(anthranilamide) directly from the solution.

The process of the invention enables the formation of high molecular weight poly(anthranilamides). The molar ratio of isatoic anhydride to starter may therefore be varied within wide ranges and may especially be in the range from 20 to 2500, preferably 40 to 2500, more preferably 50 to 2400 and most preferably in the range from 70 to 2000. The molar ratio to be chosen is of course dependent on the desired end use for the poly(anthranilamide); therefore, it is optionally also possible to use molar ratios that vary from the figures given above.

By the process of the invention, poly(anthranilamides) of the formula

{H—[HN-(ortho-$C_6H_4$)—(C=O)]$_m$}$_x$A-[(O=C)(ortho-$C_6H_4$)—NH]$_n$—H     (I)

in which
m and n denote the number of repeat units,
x is 0 or 1,
A derives from a starter molecule comprising aminic NH or $NH_2$ groups by removal of a hydrogen atom from all aminic NH and $NH_2$ groups, wherein the starter molecule is an aliphatic mono- or diamine having 5 to 13 carbon atoms, an araliphatic mono- or diamine having 7 to 15 carbon atoms, an aromatic diamine having 6 to 13 carbon atoms, or a carboxamide of the formula Ar—(C=O)NHR in which Ar denotes an aromatic radical substituted by an aminic NH or $NH_2$ group (especially $H_2N$—$C_6H_4$) and R denotes an aromatic or aliphatic radical,
are obtainable.

The embodiments mentioned above for the process of the invention are also correspondingly applicable to the poly(anthranilamide) of the invention. For instance, the starter used for preparation of the poly(anthranilamide) may comprise a starter molecule such as, in particular, neopentylamine, hexamethylenediamine (especially hexamethylene-1,6-diamine), methylenedicyclohexyldiamine (especially 2,2'-, 2,4'- and/or 4,4'-methylenedicyclohexyldiamine), pentamethylenediamine (especially pentamethylene-1,5-diamine), xylylenediamine (especially xylylene-1,3-diamine), methylenediphenylenediamine (especially 2,2'-, 2,4'- and/or 4,4'-methylenediphenylenediamine), naphthylenediamine (especially naphthylene-1,5-diamine), tolylenediamine (especially meta- and/or ortho-tolylenediamine) or N-neopentylanthranilamide (Ar=ortho-$C_6H_4$—$NH_2$; R=neopentyl). The starter may also comprise two or more different starter molecules.

In one embodiment, the total number (i.e. m+n) of the repeat (O=C)(ortho-$C_6H_4$)—NH-units is 20 to 2500, preferably 40 to 2500, more preferably 50 to 2400 and most preferably 70 to 2000. In the case of difunctional starter molecules, these repeat units are distributed between the two polymer chains formed. When both aminic groups of the starter molecule have the same reactivity (which is the case in symmetric starter molecules, for example in the aforementioned hexamethylene-1,6-diamine), m and n are (at least essentially) equal, meaning that (at least approximately) m=n=(m+n)/2. If there is a difference in the reactivity of the aminic groups, for example on account of steric hindrance or because one aminic group has higher basicity than the other, it is also possible for unequal chain lengths to be formed.

The poly(anthranilamides) obtainable in accordance with the invention are suitable for various applications. Therefore, the present invention further provides for the use of a poly(anthranilamide) of the invention in the production of fibers or of composite materials from poly(anthranilamide) and (at least) one other material comprising a metal, a mineral material (e.g. concrete) or a polymer other than poly(anthranilamide) (e.g. polyurethane). The fibers or composite materials preferably serve for production of protective equipment (especially, but not limited to, items of apparel, for example of protective suits and vests) for defense from fire, from splinter formation, from penetration of splinters, from mechanical impacts (including shots) or from cuts. It is likewise possible to use the fibers or composite materials for production of sports equipment.

The invention is hereinbelow more particularly elucidated with reference to examples.

EXAMPLES

Analysis

The number-average molar mass ($M_n$) of the resulting poly(anthranilamide) was determined by means of $^1$H NMR spectroscopy (from Bruker, AV III HD 600, 600 MHz; pulse sequence zg30, delay time d1: 10 s, 64 scans). Each sample was dissolved in deuterated sulfuric acid. The relevant resonances in the $^1$H NMR spectrum (based on TMS=0 ppm) are as follows:

The signals at 8.5-7.1 ppm are used for the aromatic protons of anthranilamide (corresponding to an integral of 4 protons). The resonances of the protons of the neopentylamine starter have a shift of 3.6-3.4 ppm (methylene group, corresponding to an integral of 2 protons) and 1.1-0.9 ppm (neopentyl group, corresponding to a integral of 9 protons).

The molar mass $M_n$ of the polymer is calculated according to formula (I) as follows, using the following abbreviations:
F(A)=area of the resonance at 8.5-7.1 ppm of the aromatic protons (4 protons);
F(M)=area of the resonance at 3.6-3.4 ppm of the methylene group of the starter (2 protons);
F(N)=area of the resonance at 1.1-0.9 ppm of the neopentyl group of the starter (corresponding to 9 protons).

The following formula (I) was used to calculate the number m+n of repeat units from (O=C)(ortho-$C_6H_4$)—NH in the polymer (in the specific case, m=0, and therefore m+n=n):

$$n = \frac{F(A)}{F(N)} \cdot \frac{9}{4} \quad (I)$$

The number n was used to calculate the molar mass $M_n$ of the polymer by the following formula (II):

$$M_n = 86.16 \text{ g/mol} + n \cdot 120.14 \text{ g/mol} + 1 \text{ g/mol} \quad (II)$$

Example 1: Preparation of Poly(Anthranilamide) by Ring-Openinq Polymerization of Isatoic Anhydride as Monomer and Neopentylamine as Starter in Diphenyl Ether as Solvent Isatoic anhydride and diphenyl ether were sourced from Sigma-Aldrich, and neopentylamine from ABCR (step (A)).

A 500 mL four-neck flask was equipped with a distillation system, precision glass stirrer, temperature probe, nitrogen feed and gas exit/gas outlet with pressure relief valve. Subsequently, 98 g of isatoic anhydride and 171 g of diphenyl ether were weighed in. Nitrogen was introduced at 10 L/h for 20 minutes, in the course of which the mixture was heated to 40° C. while stirring at 300 rpm. Subsequently, 0.26 g of neopentylamine was introduced and the solution was stirred at 180° C. for 15 h (step (B)). A suspension was obtained.

The molar mass $M_n$ was determined in accordance with formula (II) by means of $^1$H NMR in $D_2SO_4$.

20 g of the poly(anthranilamide) suspension was dissolved in 20 mL of concentrated sulfuric acid. The precipitated solid (=diphenyl ether solvent) was removed by filtration (step (C)).

The filtered sulfuric acid solution was added to 300 mL of water (step (D)(ii)). The precipitated solid was isolated by filtration and then dried at 160° C. at 0.05 bar for 24 h.

Example 2: Preparation of Poly(Anthranilamide) by Ring-Opening Polymerization of Isatoic Anhydride as Monomer and Neopentylamine as Starter in Diphenyl Ether as Solvent The procedure was as in example 1, apart from the following differences:
90 g isatoic anhydride, 130 g of diphenyl ether and 0.80 g of neopentylamine were used.

Example 3: Preparation of Poly(Anthranilamide) by Ring-Opening Polymerization of Isatoic Anhydride as Monomer and Neopentylamine as Starter in Diphenyl Ether as Solvent The procedure was as in example 1, apart from the following differences:
100 g isatoic anhydride, 390 g of diphenyl ether and 0.060 g of neopentylamine were used.

The table below compares the analytical results.

TABLE 1

Properties of the poly(anthranilamides) prepared in examples 1, 2 and 3

| Example | n (theoretical) | n (from $^1$H NMR) | $M_n$ (from $^1$H NMR) [g/mol] |
|---|---|---|---|
| 1 | 200 | 264 | 31 500 |
| 2 | 60 | 73 | 8770 |
| 3 | 900 | 809 | 96 400 |

Example 4: Preparation of Poly(Anthranilamide) by Ring-Opening Polymerization of Isatoic Anhydride as Monomer and Hexamethylene-1,6-Diamine as Starter in Diphenyl Ether as Solvent Isatoic anhydride, diphenyl ether and hexamethylene-1,6-diamine were sourced from Sigma-Aldrich (step (A)).

A 100 mL four-neck flask was equipped with a distillation system, precision glass stirrer, temperature probe, nitrogen feed and gas exit/gas outlet with pressure relief valve. Subsequently, 10 g of isatoic anhydride and 37 g of diphenyl ether were weighed in. Nitrogen was introduced at 10 L/h for 20 minutes, in the course of which the mixture was heated to 40° C. while stirring at 300 rpm. Subsequently, 0.050 g of hexamethylene-1,6-diamine was introduced and the solution was stirred at 180° C. for 15 h (step (B)). A suspension was obtained.

The molar mass $M_n$ was determined in accordance with formula (II) by means of $^1$H NMR in $D_2SO_4$. 20 g of the poly(anthranilamide) suspension was dissolved in 20 mL of concentrated sulfuric acid. The precipitated solid (=diphenyl ether solvent) was removed by filtration (step (C)).

The filtered sulfuric acid solution was added to 300 mL of water (step (D)(ii)). The precipitated solid was isolated by filtration and then dried at 160° C. at 0.05 bar for 24 h.

Example 5: Preparation of Poly(Anthranilamide) by Ring-Opening Polymerization of Isatoic Anhydride as Monomer and Hexamethylene-1,6-Diamine as Starter in Diphenyl Ether as Solvent The procedure was as in example 4, apart from the following differences:
10 g isatoic anhydride, 37 g of diphenyl ether and 0.11 g of hexamethylene-1,6-diamine were used.

Example 6: Preparation of Poly(Anthranilamide) by Ring-Opening Polymerization of Isatoic Anhydride as Monomer and Hexamethylene-1,6-Diamine as Starter in Diphenyl Ether as Solvent The procedure was as in example 4, apart from the following differences:
20 g isatoic anhydride, 75 g of diphenyl ether and 0.015 g of hexamethylene-1,6-diamine were used.

Example 7: Preparation of Poly(Anthranilamide) by Ring-Opening Polymerization of Isatoic Anhydride as Monomer and Hexamethylene-1,6-Diamine as Starter in Diphenyl Ether as Solvent The procedure was as in example 4, apart from the following differences:
25 g isatoic anhydride, 140 g of diphenyl ether and 0.005 g of hexamethylene-1,6-diamine were used.

The table below compares the analytical results.

TABLE 2

Properties of the poly(anthranilamides) prepared in examples 4 to 7

| Example | m + n (theoretical) | m + n (from $^1$H NMR) | $M_n$ (from $^1$H NMR) [g/mol] |
|---|---|---|---|
| 4 | 200 | 131 | 15 820 |
| 5 | 60 | 49 | 5 970 |
| 6 | 1 000 | 982 | 117 100 |
| 7 | 2 500 | 1 918 | 228 540 |

Example 8: Preparation of Poly(Anthranilamide) by Ring-Opening Polymerization of Isatoic Anhydride as Monomer and Neopentylamine as Starter in Ethylmethylimidazolium Diethylphosphate (EMIM-DEP) as Solvent at 180° C.

Isatoic anhydride and ethylmethylimidazolium diethylphosphate (EMIM-DEP) were sourced from Sigma-Aldrich, and neopentylamine from ABCR (step (A)).

A 100 mL four-neck flask was equipped with a distillation system, precision glass stirrer, temperature probe, nitrogen feed and gas exit/gas outlet with pressure relief valve. Subsequently, 10 g of isatoic anhydride and 28 g of ethylmethylimidazolium diethylphosphate (EMIM-DEP) were weighed in. Nitrogen was introduced at 10 L/h for 20 minutes, in the course of which the mixture was heated to 40° C. while stirring at 300 rpm. Subsequently, 0.010 g of neopentylamine was introduced and the solution was stirred at 180° C. for 15 h (step (B)). A clear solution was obtained.

The poly(anthranilamide) solution was added to 300 mL of water (step (D)(iii)). The precipitated solid was isolated by filtration and then dried at 160° C. at 0.05 bar for 24 h.

Example 9: Preparation of Poly(Anthranilamide) by Ring-Opening Polymerization of Isatoic Anhydride as Monomer and Hexamethylene-1,6-Diamine as Starter in Ethylmethylimidazolium Diethylphosphate (EMIM-DEP) as Solvent at 150° C.

Isatoic anhydride, ethylmethylimidazolium diethylphosphate (EMIM-DEP) and hexamethylene-1,6-diamine were sourced from Sigma-Aldrich (step (A)).

A 100 mL four-neck flask was equipped with a distillation system, precision glass stirrer, temperature probe, nitrogen feed and gas exit/gas outlet with pressure relief valve. Subsequently, 6 g of isatoic anhydride and 16 g of ethylmethylimidazolium diethylphosphate (EMIM-DEP) were weighed in. Nitrogen was introduced at 10 L/h for 20 minutes, in the course of which the mixture was heated to 40° C. while stirring at 300 rpm. Subsequently, 0.043 g of hexamethylene-1,6-diamine was introduced and the solution was stirred at 150° C. for 15 h (step (B)). A clear solution was obtained.

The poly(anthranilamide) solution was added to 300 mL of water (step (D)(iii)). The precipitated solid was isolated by filtration and then dried at 160° C. at 0.05 bar for 24 h.

In this experiment, the completeness of the elimination of $CO_2$ was checked by weighing the solution prior to precipitation of the product. In the case of complete $CO_2$ elimination, a mass of the resultant solution of 4.42 g would have been expected. A mass of 4.73 g was found, which corresponds to largely complete $CO_2$ elimination within the scope of measurement accuracy.

Example 10: Preparation of Poly(Anthranilamide) by Ring-Opening Polymerization of Isatoic Anhydride as Monomer and Neopentylamine as Starter in N-Methyl-2-Pyrrolidone (NMP) as Solvent Isatoic anhydride and N-methyl-2-pyrrolidone (NMP) were sourced from Sigma-Aldrich, and neopentylamine from ABCR (step (A)).

A 100 mL four-neck flask was equipped with a distillation system, precision glass stirrer, temperature probe, nitrogen feed and gas exit/gas outlet with pressure relief valve. Subsequently, 1 g of isatoic anhydride and 4.5 g of N-methyl-2-pyrrolidone (NMP) were weighed in. Nitrogen was introduced at 10 L/h for 20 minutes, in the course of which the mixture was heated to 40° C. while stirring at 300 rpm. Subsequently, 0.001 g of neopentylamine was introduced and the solution was stirred at 180° C. for 15 h (step (B)). A suspension was obtained.

The molar mass $M_n$ was determined in accordance with formula (II) by means of $^1H$ NMR in $D_2SO_4$.

1 g of the poly(anthranilamide) suspension was dissolved in 1 mL of concentrated sulfuric acid. The precipitated solid (=diphenyl ether solvent) was removed by filtration (step (C)).

The filtered sulfuric acid solution was added to 15 mL of water (step (D)(ii)). The precipitated solid was isolated by filtration and then dried at 160° C. at 0.05 bar for 24 h.

Example 11: Preparation of Poly(Anthranilamide) by Ring-Opening Polymerization of Isatoic Anhydride as Monomer and Neopentylamine as Starter in 1,3-Dimethyl-2-Imidazolidinone (DMI) as Solvent Isatoic anhydride and 1,3-dimethyl-2-imidazolidinone (DMI) were sourced from Sigma-Aldrich, and neopentylamine from ABCR (step (A)).

A 100 mL four-neck flask was equipped with a distillation system, precision glass stirrer, temperature probe, nitrogen feed and gas exit/gas outlet with pressure relief valve. Subsequently, 1 g of isatoic anhydride and 4.5 g of 1,3-dimethyl-2-imidazolidinone (DMI) were weighed in. Nitrogen was introduced at 10 L/h, for 20 minutes, in the course of which the mixture was heated to 40° C. while stirring at 300 rpm. Subsequently, 0.001 g of neopentylamine was introduced and the solution was stirred at 180° C. for 15 h (step (B)). A suspension was obtained.

The molar mass $M_n$ was determined in accordance with formula (II) by means of $^1H$ NMR in $D_2SO_4$.

1 g of the poly(anthranilamide) suspension was dissolved in 1 mL of concentrated sulfuric acid. The precipitated solid (=diphenyl ether solvent) was removed by filtration (step (C)).

The filtered sulfuric acid solution was added to 15 mL of water. The precipitated solid was isolated by filtration and then dried at 160° C. at 0.05 bar for 24 h (step (D)).

The table below compares the analytical results.

TABLE 3

Properties of the poly(anthranilamides) prepared in examples 10 and 11

| Example | n (theoretical) | n (from $^1H$ NMR) | $M_n$ (from $^1H$ NMR) [g/mol] |
|---|---|---|---|
| 10 | 200 | 130 | 15 660 |
| 11 | 200 | 193 | 23 400 |

Example 12: Preparation of Poly(Anthranilamide) by Ring-Opening Polymerization of Isatoic Anhydride as Monomer and Neopentylamine as Starter in a Mixture of N-Methyl-2-Pyrrolidone (NMP) and Ethylmethylimidazolium Diethylphosphate (EMIM-DEP) as Solvent Isatoic anhydride, N-methyl-2-pyrrolidone (NMP) and ethylmethylimidazolium diethylphosphate (EMIM-DEP) were sourced from Sigma-Aldrich, and neopentylamine from ABCR (step (A)).

A 100 mL four-neck flask was equipped with a distillation system, precision glass stirrer, temperature probe, nitrogen feed and gas exit/gas outlet with pressure relief valve. Subsequently, 1.5 g of isatoic anhydride, 4.5 g of N-methyl-2-pyrrolidone (NMP) and 0.236 g of ethylmethylimidazolium diethylphosphate (EMIM-DEP) were weighed in. Nitrogen was introduced at 10 L/h for 20 minutes, in the course of which the mixture was heated to 40° C. while stirring at 300 rpm. Subsequently, 0.001 g of neopentylamine was introduced and the solution was stirred at 180° C. for 15 h (step (B)). A suspension was obtained.

The molar mass $M_n$ was determined in accordance with formula (II) by means of $^1H$ NMR in $D_2SO_4$.

1 g of the poly(anthranilamide) suspension was dissolved in 1 mL of concentrated sulfuric acid. The precipitated solid (=diphenyl ether solvent) was removed by filtration (step (C)).

The filtered sulfuric acid solution was added to 15 mL of water (step (D)(ii)). The precipitated solid was isolated by filtration and then dried at 160° C. at 0.05 bar for 24 h.

Example 13: Preparation of Poly(Anthranilamide) by Ring-Opening Polymerization of Isatoic Anhydride as Monomer and Neopentylamine as Starter in a Mixture of 1,3-Dimethyl-2-Imidazolidinone (DMI) and Ethylmethylimidazolium Diethylphosphate (EMIM-DEP) as Solvent Isatoic anhydride, 1,3-dimethyl-2-imidazolidinone (DMI) and ethylmethylimidazolium diethylphosphate (EMIM-DEP) were sourced from Sigma-Aldrich, and neopentylamine from ABCR (step (A)).

A 100 mL four-neck flask was equipped with a distillation system, precision glass stirrer, temperature probe, nitrogen feed and gas exit/gas outlet with pressure relief valve. Subsequently, 1.5 g of isatoic anhydride, 4.5 g of 1,3-dimethyl-2-imidazolidinone (DMI) and 0.236 g of ethylmethylimidazolium diethylphosphate (EMIM-DEP) were weighed in. Nitrogen was introduced at 10 L/h for 20 minutes, in the course of which the mixture was heated to 40° C. while stirring at 300 rpm. Subsequently, 0.001 g of neopentylamine was introduced and the solution was stirred at 180° C. for 15 h (step (B)). A suspension was obtained.

The molar mass $M_n$ was determined in accordance with formula (II) by means of $^1H$ NMR in $D_2SO_4$.

1 g of the poly(anthranilamide) suspension was dissolved in 1 mL of concentrated sulfuric acid. The precipitated solid (=diphenyl ether solvent) was removed by filtration (step (C)).

The filtered sulfuric acid solution was added to 15 mL of water (step (D)(ii)). The precipitated solid was isolated by filtration and then dried at 160° C. at 0.05 bar for 24 h.

The table below compares the analytical results.

TABLE 4

Properties of the poly(anthranilamides) prepared in examples 9 and 10

| Example | n (theoretical) | n (from $^1H$ NMR) | $M_n$ (from $^1H$ NMR) [g/mol] |
|---|---|---|---|
| 12 | 200 | 220 | 26 260 |
| 13 | 200 | 284 | 33 680 |

The invention claimed is:
1. A poly(anthranilamide) of the formula

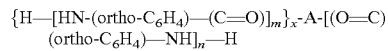

in which
m and n denote the number of repeat units and m+n is in the range from 20 to 2500,
x is 0 or 1,
A derives from a starter molecule comprising aminic NH or $NH_2$ groups by removal of a hydrogen atom from all aminic NH and $NH_2$ groups, wherein the starter molecule comprises:
an aliphatic primary or secondary mono- or diamine having 5 to 13 carbon atoms,
an araliphatic mono- or diamine having 7 to 15 carbon atoms,
an aromatic diamine having 6 to 13 carbon atoms,
a carboxamide of the formula Ar—(C=O) NHR in which Ar denotes an aromatic radical substituted by an aminic NH or $NH_2$ group and R denotes an aromatic or aliphatic radical, or
a mixture of the aforementioned starters.

2. The poly(anthranilamide) as claimed in claim 1, in which
the aliphatic primary or secondary mono- or diamine having 5 to 13 carbon atoms comprises neopentylamine, hexamethylenediamine, methylenedicyclohexyldiamine, pentamethylenediamine, or a mixture thereof,
the araliphatic mono- or diamine having 7 to 15 carbon atoms comprises xylylenediamine,
the aromatic diamine having 6 to 13 carbon atoms comprises methylenediphenylenediamine, naphthylenediamine, tolylenediamine, or a mixture thereof,
the carboxamide of the formula Ar—(C=O) NHR comprises N-neopentylanthranilamide.

3. A fiber or composite comprising the poly(anthranilamide) as claimed in claim 1 and another material comprising a metal, a mineral material or a polymer other than poly(anthranilamide).

4. The poly(anthranilamide) as claimed in claim 1, in which m+n is in the range from 70 to 2000.

5. The poly(anthranilamide) as claimed in claim 1, in which m+n is in the range from 40 to 2500.

6. The process as claimed in claim 1, in which:
the fermentable carbon-containing compound is starch hydrolyzate, sugarcane juice, sugarbeet juice, a hydrolyzate of a lignocellulose-containing raw material, or a mixture thereof,
and
the nitrogen-containing compound is gaseous ammonia, aqueous ammonia, an ammonium salt, urea, or a mixture thereof.

* * * * *